United States Patent
Goren et al.

(10) Patent No.: US 10,766,300 B2
(45) Date of Patent: Sep. 8, 2020

(54) EXPANDABLE AND RETRACTABLE WHEEL ASSEMBLY

(71) Applicants: Michael Goren, Niskayuna, NY (US); Jeremy Goren, Niskayuna, NY (US)

(72) Inventors: Michael Goren, Niskayuna, NY (US); Jeremy Goren, Niskayuna, NY (US)

( * ) Notice: Subject to any disclaimer, the term of this patent is extended or adjusted under 35 U.S.C. 154(b) by 439 days.

(21) Appl. No.: 15/808,462

(22) Filed: Nov. 9, 2017

(65) Prior Publication Data

US 2019/0135030 A1    May 9, 2019

(51) Int. Cl.
| | | |
|---|---|---|
| *B60B 9/28* | (2006.01) | |
| *B60B 27/06* | (2006.01) | |
| *B60B 3/08* | (2006.01) | |
| *B60B 9/24* | (2006.01) | |
| *B60B 9/02* | (2006.01) | |
| *B60B 19/04* | (2006.01) | |
| *B60B 21/00* | (2006.01) | |

(52) U.S. Cl.
CPC ............ *B60B 9/28* (2013.01); *B60B 3/08* (2013.01); *B60B 9/02* (2013.01); *B60B 9/24* (2013.01); *B60B 19/04* (2013.01); *B60B 27/06* (2013.01); *B60B 21/00* (2013.01); *B60B 2900/551* (2013.01)

(58) Field of Classification Search
CPC .... B60B 9/28; B60B 9/24; B60B 9/02; B60B 27/06; B60B 3/08
See application file for complete search history.

(56) References Cited

U.S. PATENT DOCUMENTS

| | | | |
|---|---|---|---|
| 1,822,584 A | 9/1931 | Connors | |
| 3,607,558 A | 9/1971 | Nebout | |
| 3,802,743 A * | 4/1974 | Hermanns | ............... B60B 19/04 |
| | | | 301/5.1 |
| 3,833,444 A | 9/1974 | Mallory | |
| 4,046,339 A * | 9/1977 | Stancliffe | ............... B64C 25/36 |
| | | | 244/103 R |

(Continued)

FOREIGN PATENT DOCUMENTS

WO    2013133830 A2    9/2013

OTHER PUBLICATIONS

Olympus Controls, http://www.olympus-controls.com/Products/Actuators.html, accessed Nov. 8, 2017.

(Continued)

*Primary Examiner* — Scott A Browne
(74) *Attorney, Agent, or Firm* — Foley Hoag LLP; Rajesh Vallabh

(57) ABSTRACT

An expandable and retractable wheel assembly in accordance with one or more embodiments includes a hub structure having a circular periphery and a rim expandable in circumference from a retracted circular position to one or more expanded circular positions. The rim engages and is supported by the circular periphery of the hub structure when in the retracted position. A plurality of linear actuators is attached to and supported by the hub structure. Each linear actuator includes a piston rod and a drive system for moving the piston rod from a retracted position to one or more extended positions, wherein a distal end of the piston rod engages and moves the rim when the piston rod is extended and also supports the rim in the one or more expanded rim positions.

21 Claims, 6 Drawing Sheets

(56) References Cited

U.S. PATENT DOCUMENTS

| | | | |
|---|---|---|---|
| 4,470,637 A | 9/1984 | Kopp et al. | |
| 4,547,251 A | 10/1985 | Landsness | |
| 4,923,554 A | 5/1990 | Ozawa | |
| 5,195,932 A | 3/1993 | Hirai et al. | |
| 5,203,947 A | 4/1993 | Boeker | |
| 5,332,082 A | 7/1994 | Sommerfield | |
| 5,492,390 A * | 2/1996 | Kugelmann, Sr. | B60B 19/00 301/5.1 |
| 5,635,016 A | 6/1997 | Byerley | |
| 5,709,768 A | 1/1998 | Byerley | |
| 6,257,676 B1 | 7/2001 | Lacombe et al. | |
| 6,962,359 B2 | 11/2005 | Huhmarkangas et al. | |
| 7,073,660 B1 | 7/2006 | Hishinuma | |
| 7,214,175 B2 | 5/2007 | Janzen | |
| 7,246,671 B2 | 7/2007 | Goren et al. | |
| 8,021,507 B2 | 9/2011 | Iyanagi | |
| 8,037,957 B2 | 10/2011 | Laurent | |
| 8,240,689 B2 | 8/2012 | Holt et al. | |
| 9,126,649 B2 | 9/2015 | Takenaka et al. | |
| 9,127,745 B2 | 9/2015 | Rogozinski et al. | |
| 9,180,733 B2 * | 11/2015 | Sgherri | B60B 19/04 |
| 9,228,819 B2 | 1/2016 | Pruitt et al. | |
| 9,254,741 B2 | 2/2016 | Park et al. | |
| 9,527,536 B1 | 12/2016 | Giesmann et al. | |
| 9,539,856 B2 | 1/2017 | Visscher | |
| 9,539,876 B2 | 1/2017 | Winshtein et al. | |
| 9,796,434 B2 * | 10/2017 | Alidan | B62D 55/06 |
| 10,525,766 B2 * | 1/2020 | Daniels | B60G 3/00 |
| 2006/0197305 A1 * | 9/2006 | Wichern | B60B 9/06 280/283 |
| 2016/0068016 A1 * | 3/2016 | Winshtein | B60G 3/01 301/6.5 |
| 2017/0015370 A1 | 1/2017 | Goren et al. | |
| 2017/0066323 A1 | 3/2017 | Goren et al. | |
| 2017/0087932 A1 * | 3/2017 | Winshtein | A61G 5/06 |

OTHER PUBLICATIONS

Warner Linear, http://www.warnerlinear.com/Products/linear-actuators/rugged-duty-actuators, accessed Nov. 8, 2017.

DePangher "Design and Implementation of Eight-Legged Robotic Transporter," California Polytechnic State University, Thesis, Sep. 2013.

* cited by examiner

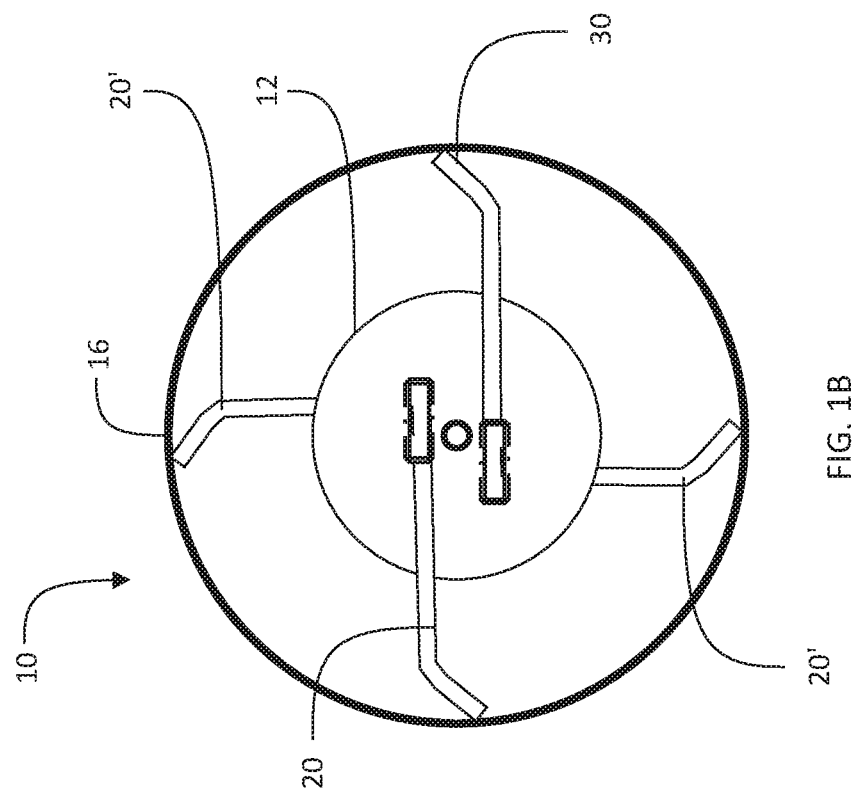
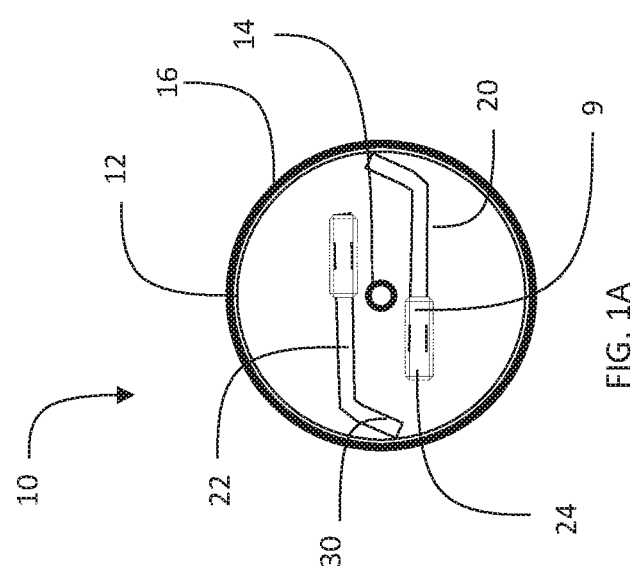
FIG. 1B
FIG. 1A

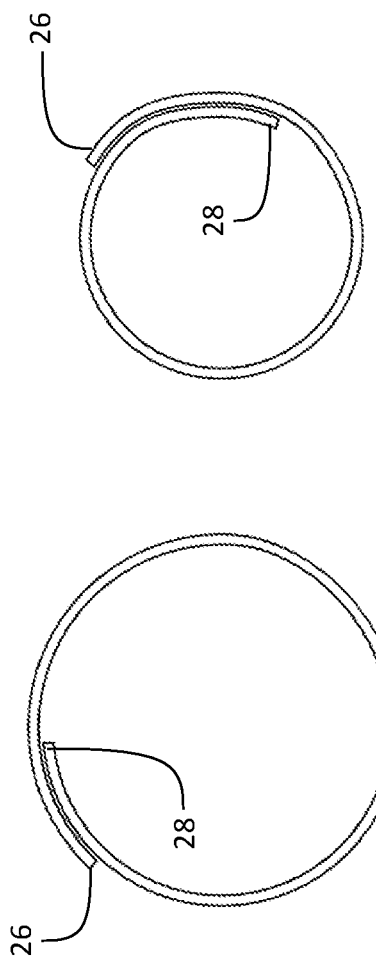
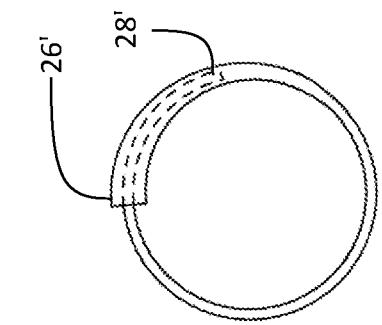
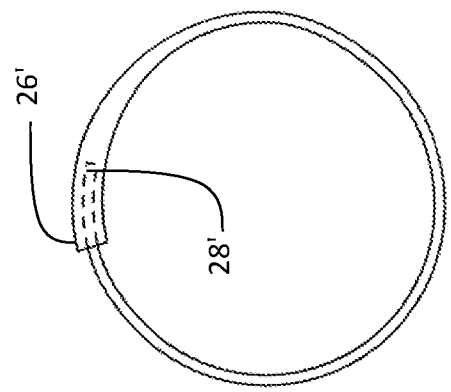
FIG. 2A
FIG. 2B
FIG. 3A
FIG. 3B

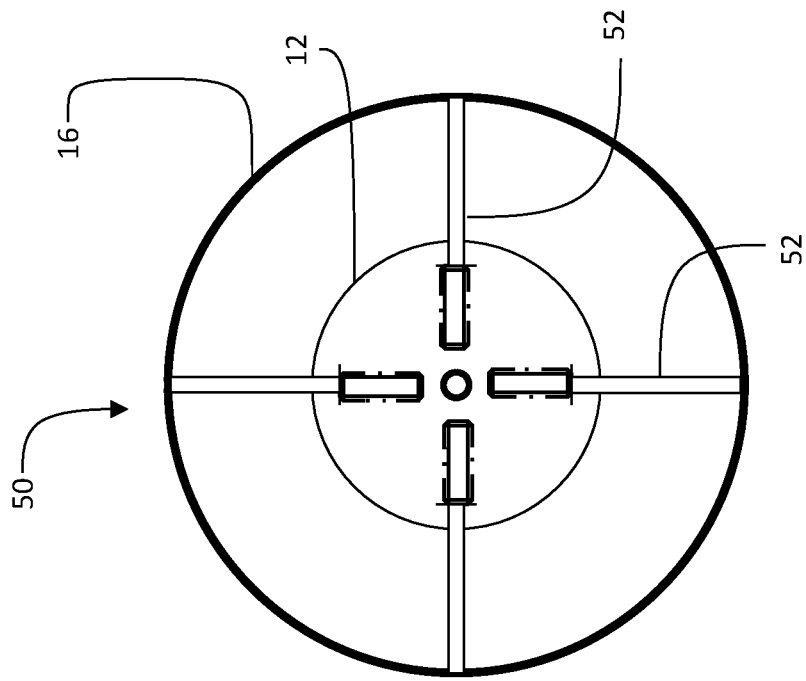
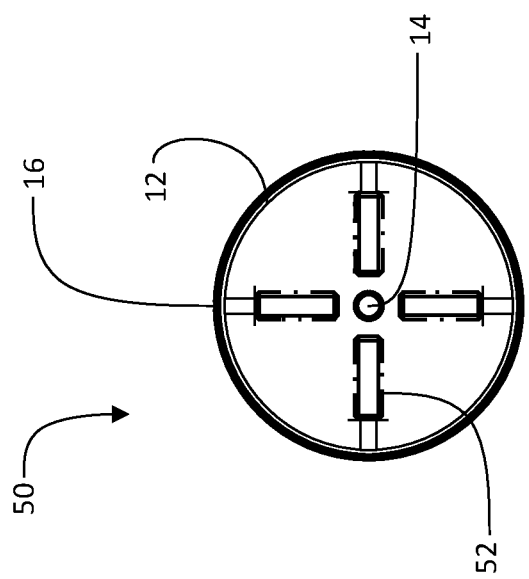

EXPANDABLE AND RETRACTABLE WHEEL ASSEMBLY

BACKGROUND

The present application relates generally to wheels and, more particularly, to a wheel that is expandable and retractable in circumference.

Wheels used for the motion of vehicles such as automobiles, motorcycles, and bicycles and for mobile robots, gear trains, machinery, and other equipment typically have a fixed circumference. For example, in bicycles, the rim of the wheel comprises a continuous fixed band supported by a set of fixed radial spokes.

For vehicles, different diameter wheels offer different driving characteristics and performance. For example, traction is different for different sized wheels. Additionally, surfaces on which wheels travel may have different configurations and dimensions. Larger circumference wheels may not fit on the tread of a step or stair. Smaller wheels make it more difficult to navigate vertical obstacles they encounter on the ground like potholes, curbs, rocks, etc. Larger wheels also provide a smoother drive over bumps. In addition, the size wheel affects torque, acceleration, and gearing. For example, a wheel with a diameter of ten inches may be useful for climbing a tread of a stair that is twelve inches. It may be useful to extend the diameter to, e.g., double that dimension, for navigating uneven surfaces of a street or sidewalk. It would be desirable to have the ability to selectively increase and decrease the circumference of wheels, as needed.

BRIEF SUMMARY OF THE DISCLOSURE

An expandable and retractable wheel assembly in accordance with one or more embodiments includes a hub structure having a circular periphery and a rim expandable in circumference from a retracted circular position to one or more expanded circular positions. The rim engages and is supported by the circular periphery of the hub structure when in the retracted position. A plurality of linear actuators is attached to and supported by the hub structure. Each linear actuator includes a piston rod and a drive system for moving the piston rod from a retracted position to one or more extended positions, wherein a distal end of the piston rod engages and moves the rim when the piston rod is extended and also supports the rim in the one or more expanded rim positions.

In accordance with one or more embodiments, a method is disclosed of expanding a wheel assembly. The wheel assembly comprises a circular hub structure, an expandable rim supported by and surrounding the circular hub structure, and a plurality of linear actuators attached to the hub structure. The method comprises the steps of: actuating each of the plurality of linear actuators to move a piston rod of each linear actuator from a retracted position to an extended position such that a distal end of the piston rod engages and moves the rim to a desired expanded circular position as the piston rod is extended; and locking the piston rod of each of the plurality of linear actuators when the rim is in the desired expanded circular position to support the rim in the desired expanded position.

BRIEF DESCRIPTION OF THE DRAWINGS

FIGS. 1A and 1B illustrate an exemplary expandable and retractable wheel assembly in accordance with one or more embodiments.

FIGS. 2A and 2B illustrate an exemplary rim usable in an expandable and retractable wheel assembly in accordance with one or more embodiments.

FIGS. 3A and 3B illustrate another exemplary rim usable in an expandable and retractable wheel assembly in accordance with one or more embodiments.

FIGS. 4A and 4B illustrate another exemplary expandable and retractable wheel assembly in accordance with one or more embodiments.

Like or identical reference numbers are used to identify common or similar elements.

DETAILED DESCRIPTION

Figure 5A:
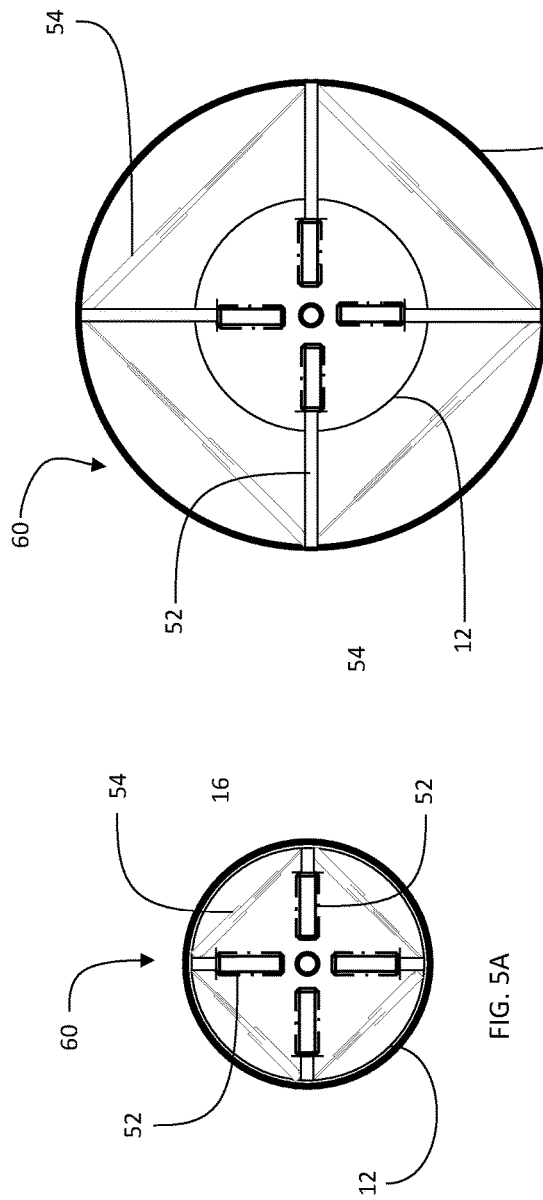
FIGS. 5A and 5B illustrate another exemplary expandable and retractable wheel assembly in accordance with one or more embodiments.

Various embodiments disclosed herein relate to expandable and retractable wheels for vehicles (such as automobiles, motorcycles, and bicycles) and for mobile robots, gear trains, machinery, and other equipment. The wheels are equipped with linear actuators enabling the wheel circumference to be increased or decreased as desired.

FIGS. 1A and 1B illustrate an exemplary expandable and retractable wheel assembly 10 in accordance with one or more embodiments. FIG. 1A shows the wheel assembly 10 in a retracted position, and FIG. 1B shows the wheel assembly 10 in an expanded position.

The wheel assembly 10 includes a hub structure 12, which comprises a hub with a central hole 14 (for receiving an axle) and a rigid circular disk around the hub.

The wheel assembly 10 also includes a rim 16, which is expandable in circumference from the retracted circular position of FIG. 1A to one or more expanded circular positions shown in FIG. 1B. The rim 16 engages and is supported by the rigid circular disk of the hub structure 12 when in the retracted position.

A plurality of linear actuators 20 attached to and supported by the hub structure 12 can be actuated to move the wheel between the retracted and one or more expanded positions. In the FIGS. 1A and 1B exemplary embodiment, there are four linear actuators: two linear actuators 20 are positioned in a parallel arrangement on one side of the hub structure 12, and the other two linear actuators 20' are positioned in a parallel arrangement on the opposite side of the hub structure 12. Each linear actuator includes a piston rod 22 and a drive system 24, which can be actuated to move the piston rod 22 from the retracted position to one or more locked extended positions. The distal end of each piston rod 22 engages and moves the rim 16 when the piston rod 22 is extended and also supports the rim 16 when locked in the expanded rim position.

The rim 16 resiliently expands in circumference from the retracted circular position of FIG. 1A to the expanded circular position of FIG. 1B. Although only one expanded position is shown (in FIG. 1B), the linear actuators can preferably be controlled to variably expand the rim 16 to various other desired circumferences.

Various types of rims can be used in the wheel assembly 10. For instance, the rim 16 may comprise an elastic material, a resilient metal band, or a belt with a spring and ratchet mechanism to maintain tension. The rim 16 may also comprise some combination of elastic material and a resilient metal or other band.

As shown in the simplified illustrations of FIGS. 2A and 2B, in one or more embodiments, the rim comprises an elongated member having opposite ends 26, 28 shaped to form a resilient ring structure. The opposite ends are unconnected and move relative to one another when the rim is expanded or retracted. In one or more alternate embodiments, one of the opposite ends 26' includes an opening to slidably receive the other end 28' of the ring structure as shown in FIGS. 3A and 3B.

In one or more embodiments, the rim 16 may comprise multiple sections or segments that may be overlapping in the retracted position.

Linear actuators are used commonly in industry, often in lifting applications. They include a piston rod that is extended and retracted along a straight line. Linear actuators can comprise, e.g., electric linear actuators, pneumatic linear actuators, or hydraulic linear actuators. Electric linear actuators can be, e.g., acme screw actuators, ball screw actuators, or track actuators. Each linear actuator can have a telescoping rod having at least two sections.

In accordance with one or more embodiments, the drive system 24 of each linear actuator 20 is powered by a motor integrated in the linear actuator 20. In one or more embodiments, the drive system 24 of each linear actuator 20 is powered by a single motor mounted on the hub. In one or more alternate embodiments, the drive system 24 of each linear actuator 20 is powered by a hub motor 9 (shown in FIG. 1A) in the wheel assembly for driving the wheel assembly. In one or more embodiments, the drive systems are manually powered.

In the FIGS. 1A and 1B embodiment, each of the linear actuators 20 is attached to the hub structure 12 at a location on the hub structure 12 offset from the center of the hub structure 12 to avoid overlapping (and interfering with) the hub center hole 14. Because of this offset positioning, the distal end 30 of the piston rod of each linear actuator is angled relative to the rest of the piston rod such that the piston rod engages the rim 16 at a point on the rim 16 generally in line with the center of the hub structure 12.

In the FIG. 1B embodiment, there are four linear actuators supporting the rim 16 in the expanded position in the 3, 6, 9, and 12 o'clock positions. (The linear actuators 20 on the front side of the hub are in the 3 and 9 o'clock positions, and the linear actuators 20' on the opposite rear side of the hub are in the 6 and 12 o'clock positions.) It should be understood that any number of linear actuators spaced equally around the hub can be used to provide suitable support for the rim 16.

In accordance with one or more embodiments, the hub structure 12 includes at least two circular disks axially spaced apart around the hub. All of the circular disks are surrounded by a single rim 16. Each of the disks supports one or more linear actuators 20 attached thereto on one or both sides of the disk. Having multiple circular disks enables the use of additional linear actuators 20 since each side of the disk in the FIGS. 1A and 1B can typically accommodate only two linear actuators.

FIGS. 4A and 4B illustrate an exemplary expandable and retractable wheel assembly 50 in accordance with one or more alternative embodiments in retracted and expanded positions, respectively. In this embodiment, the plurality of linear actuators 52 are positioned radially around the center of the hub structure 12. The linear actuators 52 can be positioned on one or both sides of the hub structure 12. As with other embodiments described herein, generally any number of linear actuators 52 may be used spaced equally around the hub 12 to support the rim 16.

Figure 5B:

FIGS. 5A and 5B illustrate an exemplary expandable and retractable wheel assembly 60 in accordance with one or more alternative embodiments in retracted and expanded positions, respectively. In this embodiment, the plurality of linear actuators 52 are positioned radially around the center 14 of the hub structure 12 similar to FIGS. 4A and 4B. In addition, expandable transverse support elements 54 connect the distal ends of the piston rods of adjacent linear actuators 52 to provide additional support for the linear actuators 52. The expandable transfer support elements 54 may be telescoping devices, and automatically expand and contract as the linear actuators 52 expand and retract the wheel assembly. Such expandable transverse support elements 54 can also be used in connection with any of the expandable and retractable wheel assemblies described herein.

In accordance with one or more embodiments, the expandable transverse support elements may be curved generally corresponding to the shape of the rim 16.

Figure 6:
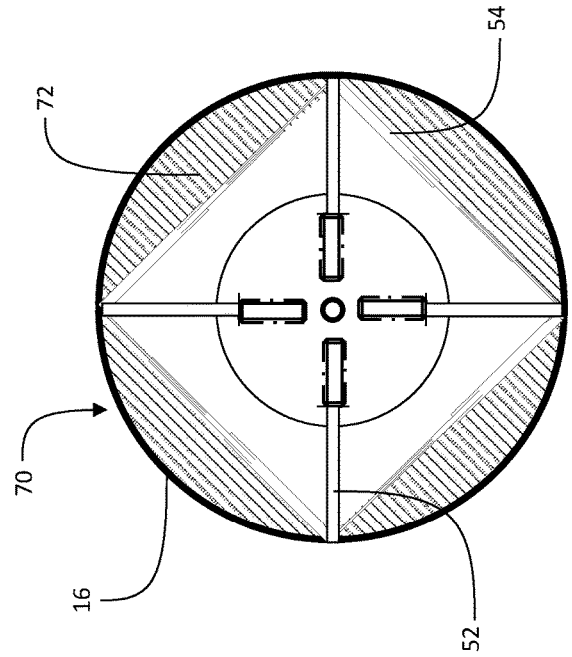
FIG. 6 illustrates another exemplary expandable and retractable wheel assembly in accordance with one or more embodiments.

FIG. 6 illustrates an exemplary expandable and retractable wheel assembly 70 in accordance with one or more alternative embodiments shown in an expanded position. The wheel assembly 70 is similar to the wheel assembly 60 of FIGS. 5A and 5B, but further includes one or more inflatable structures 72 disposed between each expandable transfer support element 54 and the rim 16 to further support the rim 16 in the expanded position. The inflatable structure 72 may comprise a plurality of compartments that can be inflated with air. Such inflatable structures 72 can be used in connection with any of the expandable and retractable wheel assemblies described herein.

Figure 7:
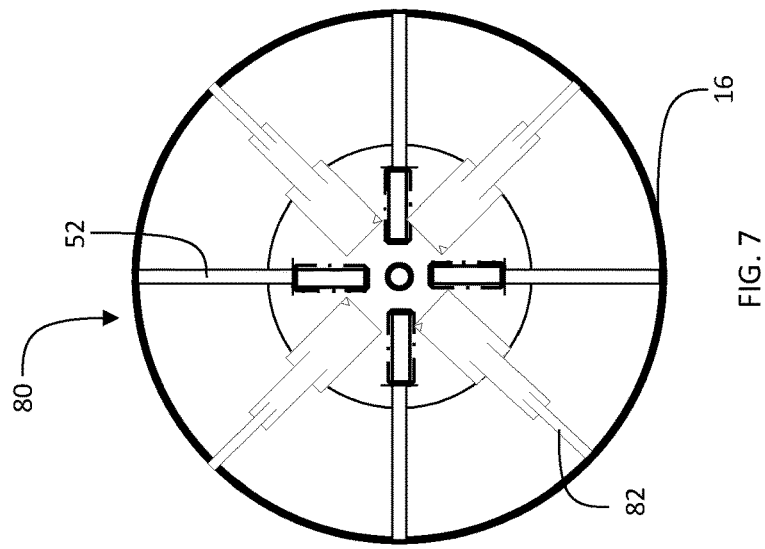
FIG. 7 illustrates another exemplary expandable and retractable wheel assembly in accordance with one or more embodiments.

FIG. 7 illustrates an exemplary expandable and retractable wheel assembly 80 in accordance with one or more alternative embodiments shown in an expanded position. The wheel assembly 80 is similar to the wheel assembly 60 of FIGS. 5A and 5B, but further includes one or more telescoping boom support elements 82 extending radially from the center 14 of the hub structure 12 between two adjacent linear actuators 52, which also extends radially from the center 14 of the hub 12. The telescoping boom support elements 82 provide additional support for the linear actuators 52 in supporting the rim 16. The telescoping boom support elements 82 are connected to the rim 16 (or optionally to a transverse element connecting the distal ends of the linear actuators) and are caused to elongate/contract as the linear actuators 52 expand/contract the rim 16. The telescoping boom support elements 82 can be locked in position once the wheel 80 is at a desired expanded position. Such boom support elements 82 can also be used in connection with any of the expandable and retractable wheel assemblies described herein.

Figure 8:
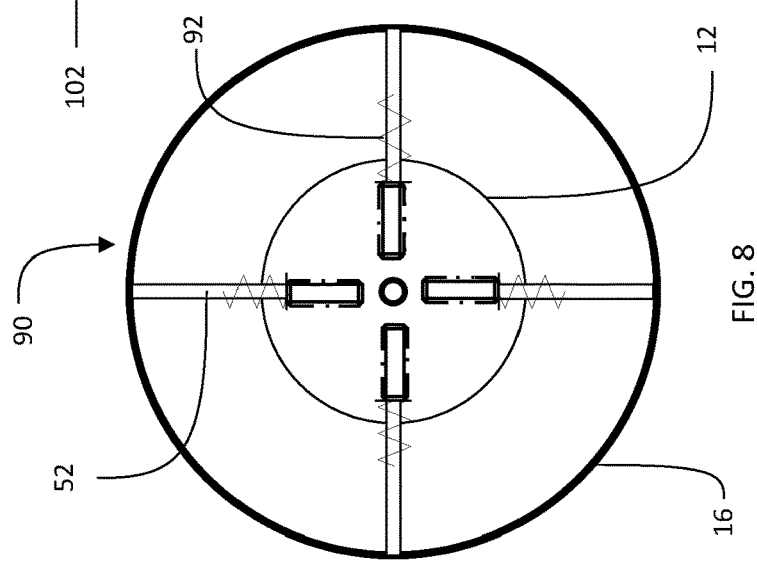
FIG. 8 illustrates another exemplary expandable and retractable wheel assembly in accordance with one or more embodiments.

FIG. 8 illustrates an exemplary expandable and retractable wheel assembly 90 in accordance with one or more alternative embodiments shown in an expanded position. In this embodiment, each linear actuator 52 further includes a shock absorbing element 92 (such as, e.g., a spring) engaging the piston rod for dampening or absorbing shock between the hub structure 12 and the rim 16 when the wheel assembly 90 is used. Such shock absorbing elements 92 can also be used in connection with any of the expandable and retractable wheel assemblies described herein.

Figure 9:
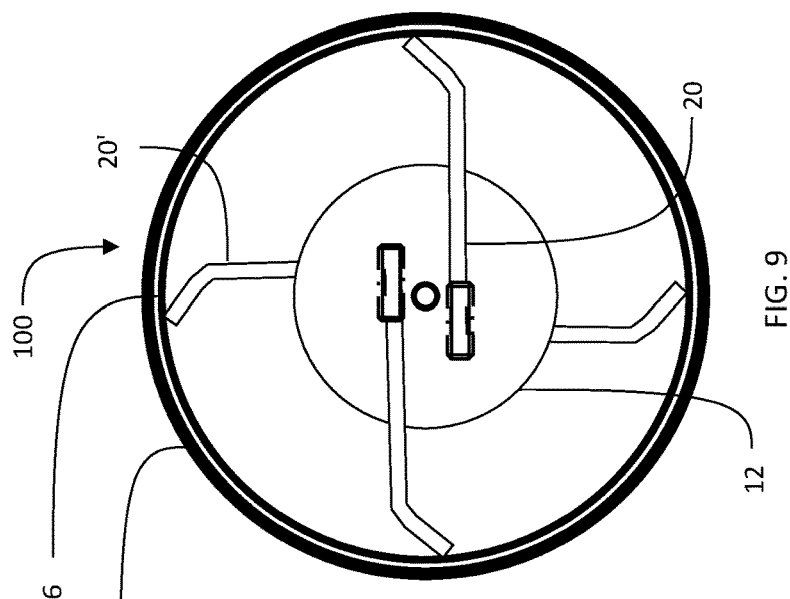
FIG. 9 illustrates another exemplary expandable and retractable wheel assembly in accordance with one or more embodiments.

FIG. 9 illustrates an exemplary expandable and retractable wheel assembly 100 in accordance with one or more alternative embodiments shown in an expanded position. In this embodiment, an elastic tire 102 is secured around the rim 16. The tire 102 resiliently expands and contracts as the rim 16 expands and contracts, respectively, to maintain a close fit on the rim 16. Such elastic tires 102 can be used in connection with any of the expandable and retractable wheel assemblies described herein.

Figure 10:
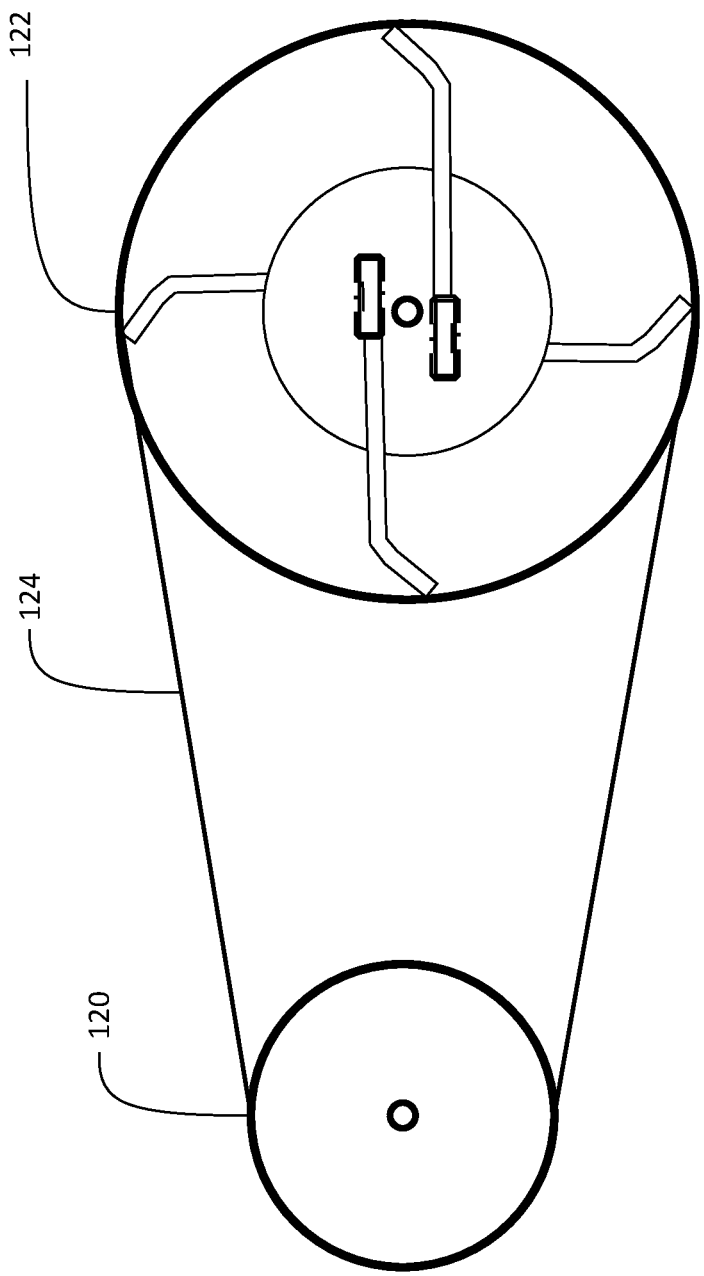
FIG. 10 illustrates an exemplary gear mechanism including an expandable and retractable wheel assembly in accordance with one or more embodiments.

In addition to vehicles and mobile robots, expandable wheels in accordance with various embodiments may be used in gear mechanisms. FIG. 10 shows an exemplary gear mechanism comprising two gears 120, 122 connected by a belt 124 in accordance with one or more embodiments. One of the gears 122 comprises an expandable wheel 10. (In some embodiments, both gears can comprise expandable wheels.) The wheel 10 can be expanded or retracted for various purposes including, e.g., to adjust the gear ratio of the gear mechanism.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions. Accordingly, the foregoing description and attached drawings are by way of example only, and are not intended to be limiting.

What is claimed is:

1. An expandable and retractable wheel assembly, comprising:
    a hub structure comprising a hub configured to be supported by an axle and at least one rigid circular disk affixed to the hub, said at least one rigid circular disk having axially facing surfaces perpendicular to the axle and a radially outer facing surface;
    a rim expandable in circumference from a retracted circular position to one or more expanded circular positions, wherein the rim engages and is supported by the radially outer facing surface of the at least one rigid circular disk of the hub structure when in the retracted position;
    a plurality of linear actuators attached to and supported by one or more axially facing surfaces of the at least one rigid circular disk of the hub structure, each linear actuator including a piston rod and a drive system for moving the piston rod from a retracted position to one or more extended positions, wherein a distal end of the piston rod engages and moves the rim when the piston rod is extended and also supports the rim in the one or more expanded rim positions.

2. The expandable and retractable wheel assembly of claim 1, wherein the hub structure comprises at least two circular disks axially spaced apart along the hub, wherein each of said disks includes one or more linear actuators attached thereto.

3. The expandable and retractable wheel assembly of claim 1, wherein each of the linear actuators is attached to the one or more axially facing surfaces of the at least one rigid circular disk of the hub structure at a location on the hub structure such that the piston rod of each of the plurality of linear actuators travels on a line offset from the center of the hub structure, and wherein the distal end of the piston rod of each of the plurality of linear actuators is angled relative to the rest of the piston rod such that the piston rod engages the rim at a point on the rim in line with the center of the hub structure.

4. The expandable and retractable wheel assembly of claim 1, wherein the plurality of linear actuators are affixed to the at least one rigid circular disk and positioned radially around the center of the hub structure.

5. The expandable and retractable wheel assembly of claim 1, wherein each of the plurality of linear actuators comprises a telescoping linear actuator having at least two sections.

6. The expandable and retractable wheel assembly of claim 1, wherein said plurality of linear actuators comprise electric linear actuators, pneumatic linear actuators, or hydraulic linear actuators.

7. The expandable and retractable wheel assembly of claim 1, further comprising an expandable transverse support element connecting the distal ends of the piston rods of two linear actuators.

8. The expandable and retractable wheel assembly of claim 7, wherein the expandable transverse support element is curved corresponding to the shape of the rim.

9. The expandable and retractable wheel assembly of claim 7, wherein the expandable transfer support element comprises a telescoping device.

10. The expandable and retractable wheel assembly of claim 7, further comprising an inflatable structure between the expandable transfer support element and the rim to further support the rim.

11. The expandable and retractable wheel assembly of claim 1, further comprising a telescoping boom support element extending radially from the center of the hub structure between two of the plurality of linear actuators, which also extends radially from the center of the hub, to provide additional support for the two linear actuators in supporting the rim.

12. The expandable and retractable wheel assembly of claim 1, wherein the rim resiliently expands in circumference from the retracted circular position to one or more expanded circular positions.

13. The expandable and retractable wheel assembly of claim 12, wherein the rim comprises an elastic material, a resilient metal band, or a belt with a spring and ratchet mechanism to maintain tension.

14. The expandable and retractable wheel assembly of claim 12, wherein the rim comprises an elongated member having opposite ends shaped to form a resilient ring structure, wherein the opposite ends are unconnected and move relative to one another when the rim is expanded or retracted.

15. The expandable and retractable wheel assembly of claim 14, wherein one of the opposite ends includes an opening to slidably receive the other of the opposite ends of the ring structure.

16. The expandable and retractable wheel assembly of claim 1, wherein each of said plurality of linear actuators includes a shock absorbing elastic element engaging the piston rod for dampening shock between the hub structure and the rim when the wheel assembly is used.

17. The expandable and retractable wheel assembly of claim 1, wherein the drive system of each linear actuator is powered by a motor integrated in the linear actuator or by a hub motor in the wheel assembly for driving the wheel assembly.

18. The expandable and retractable wheel assembly of claim 1, further comprising a tire secured around the rim, said tire resiliently expanding and contracting as the rim expands and contracts, respectively, to maintain a close fit on the rim.

19. A gear mechanism having at least one gear comprising the expandable and retractable wheel assembly of claim 1, wherein the wheel assembly can be expanded or retracted to adjust the gear ratio.

20. A method of expanding a wheel assembly, said wheel assembly comprising a hub structure comprising a hub configured to be supported by an axle and at least one rigid circular disk affixed to the hub, said at least one rigid circular disk having axially facing surfaces perpendicular to the axle and a radially outer facing surface; a rim expandable in circumference from a retracted circular position to one or more expanded circular positions, wherein the rim engages and is supported by the radially outer facing surface of the at least one rigid circular disk of the hub structure when in the retracted position; a plurality of linear actuators attached to and supported by one or more axially facing surfaces of the at least one rigid circular disk of the hub structure, each linear actuator including a piston rod and a drive system for moving the piston rod from a retracted position to one or more extended positions, the method comprising the steps of:

actuating each of the plurality of linear actuators to move a piston rod of each linear actuator from a retracted position to one of the one or more extended positions such that a distal end of the piston rod engages and moves the rim to a desired expanded circular position as the piston rod is extended; and locking the piston rod of each of the plurality of linear actuators when the rim is in the desired expanded circular position to support the rim in the desired expanded position.

21. The expandable and retractable wheel assembly of claim 1, wherein the rim has a continuous outer surface in the retracted circular position and each extended circular position.

* * * * *